Oct. 25, 1966     M. S. WRIGHT     3,281,232
PIVOTED GLASS SHEET BENDING MOLD
Filed Feb. 12, 1963     2 Sheets-Sheet 1
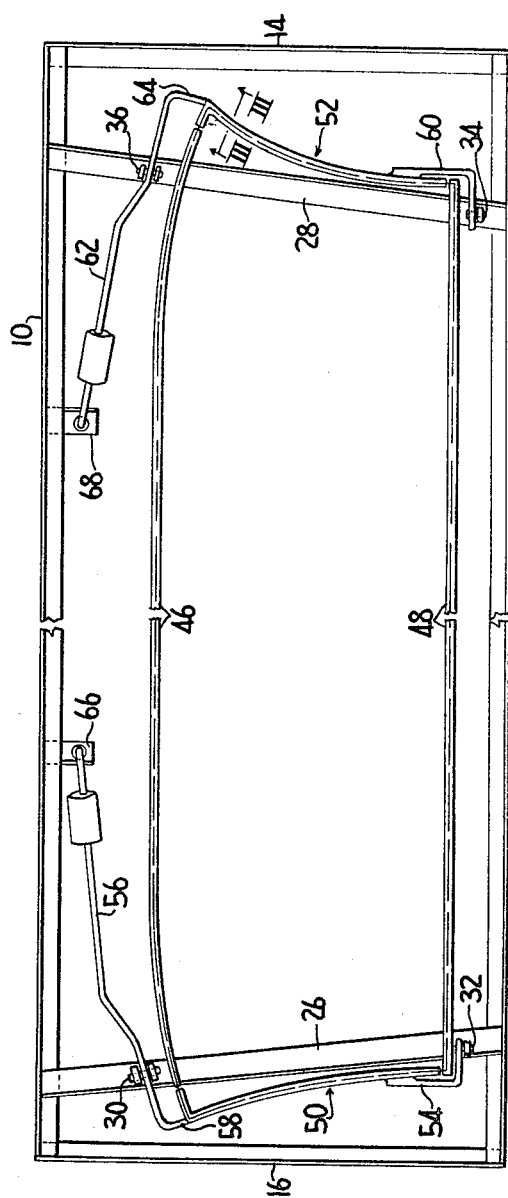
INVENTOR.
MILES S. WRIGHT
BY Oscar L. Spencer
ATTORNEY Oct. 25, 1966    M. S. WRIGHT    3,281,232
PIVOTED GLASS SHEET BENDING MOLD Filed Feb. 12, 1963    2 Sheets-Sheet 2

INVENTOR.
MILES S. WRIGHT
BY
Oscar L Spencer
ATTORNEY the United States Patent Office 3,281,232
Patented Oct. 25, 1966

3,281,232
PIVOTED GLASS SHEET BENDING MOLD
Miles S. Wright, South Greensburg, Pa., assignor to Pittsburgh Plate Glass Company, Pittsburgh, Pa. a corporation of Pennsylvania
Filed Feb. 12, 1963, Ser. No. 258,062
8 Claims. (Cl. 65—291)

This invention relates to Bending Glass Sheets and particuarly relates to sectionalized glass sheet bending molds of the outline type specifically designed to minimize overbending of the tips of glass sheets bent to irregular shapes.

The flat glass industry has developed sectionalized skeletonized glass sheet bending molds for bending glass sheets of nonrectangular outline to non-uniform curvatures. These molds have an outline shaping surface of concave elevation conforming in both shape and outline to that of the bent glass.

The shaping surface is formed by the upper surfaces of spaced, elongated rails comprising a center mold section and by the upper surfaces of additional rails comprising end mold sections pivoted to the center mold section by means of hinges for movement from a spread mold position to support a flat glass sheet into a closed mold position wherein the upper surfaces of the end mold section rails form continuations of the upper surfaces of the center section rails to form an outline shaping surface that supports the under surface of the glass sheet after bending adjacent its marginal portion. The mold members or sections are usually composed of stainless steel or other like material that does not soften at the elevated temperatures needed to bend glass sheets.

Two glass sheets of substantially the same thickness or of different thicknesses having a total nominal thickness of one-quarter inch are bent in pairs and subsequently laminated or single glass sheets of the total nominal thickness of one-quarter inch or less are bent and subsequently tempered according to present commercial practice. Glass sheets of soda-lime-silica composition are usually exposed for up to 30 minutes at elevated temperatures up to about 1250 degrees Fahrenheit to produce the required bends. Usually the bending itself takes only a few seconds at the end of the heating cycle.

The sectionalized molds described above are especially effective in producing curvatures necessary for present day "wrap around" windshields. The latter extend continuously across the entire front of an automobile and have their longitudinal extremities curved sharply into the sides of the vehicle relative to a gently bent central portion.

The end mold sections are preferably counterweighted by means of counterweighted lever arms attached to the end mold sections and extending longitudinally inward from the hinges to cause the attached end mold sections to rotate upward from the spread mold position to the closed mold position in response to the softening of the glass sheet upon exposure to the elevated temperatures. The end mold sections pivot through an acute angle relative to the hinge axes from the spread mold position to the closed mold position.

In order to support glass sheets of nonrectangular outline in nontilting relation with respect to the shaping surface, the prior art molds made provision for intermediate supports which formed part of the mold construction. The most effective of these constructions provided nontilting support for the flat glass at the longitudinal extremities of the center mold section rails. The latter contacted the undersurface of the flat glass sheet intermediate its longitudinal extremities and adjacent its side edges when the end sections were rotated into the spread mold position. Such a construction is disclosed in U.S. Patent No. 2,924,045 to Paul Startzell.

The most effective molds of this type in the prior art include a support frame which provides solid support for the central mold section. Another characteristic of these most effective molds is the absence of edge surface contacting members which apply a longitudinal compresive force which distorts the end edges of the supported sheets.

When the end mold sections of this type of mold rotate into a spread mold position, they engage the bottom surface only of the flat glass sheet to support the latter as a beam adjacent its longitudinal extremities. The flat glass sheet is also supported near its side edges and intermediate its ends by the ends of the center mold section rails.

According to present commercial practice, such glass-laden molds are successively conveyed laterally through a tunnel-like bending lehr. In the lehr, the molds are first conveyed through a preheat zone where they are exposed to successive patterns of increasing temperatures until they reach a temperature just below the glass softening point. Then they are exposed to a bending zone whose temperature patterns include spaced regions of relatively high temperature that irradiate the regions of the glass sheet to be bent sharply. This latter temperature pattern is necessary because the portions of a glass sheet to be bent sharply must pass through the spaced regions of relatively high temperature while the central portions of the glass sheets which are to be bent relatively gently simultaneously pass through the intermediate regions of relatively low temperature.

When glass-laden molds are subjected to glass softening temperatures, the central portion of the glass sheet sags to conform to the upper shaping surfaces of the center mold section rails, while the end mold sections rotate upward into the closed mold position, thus lifting the soft glass sheet exterimities from a flat to a curved configuration.

If the regions of high intensity are located close to the extremities of the center mold member rails that support the glass side edge portions intermediate the ends of the glass sheet, the glass tends to sag downward in the regions flanking the intermediate support points. Such sagging forms kinks adjacent its side edges supported by the longitudinal extremities of the center molding member rails. This kinking results as the relatively soft glass is penetrated by the relatively hard stainless steel of the shaping rail during the heat-softening needed for bending Prior art molds also form "scuff marks" which result from mechanical abrasion of the glass sliding over the pointed rail extremities.

One method developed to avoid this marking and kinking has been to provide sufficient force to lift the glass sheet entirely of its intermediate support points at the longitudinal extremities of the center mold section shaping rails as the extremity portions are lifted upward to shape the glass sheet before depositing the shaped sheet on the shaping rails. However, this solution promotes longitudinal misalignment of the glass with respect to the shaping surface unless the mold closing forces and frictional forces associated with the closing of the mold are controlled within tolerances too critical for use in mass-production operations.

This misalignment causes the glass to bend improperly and makes it difficult, if not impossible, to install the bent sheet in a glazing frame. Kinking serves as the origin of "cross car distortion," a term applied to areas of apparent distortion resulting from viewing through the windshield at a sharp oblique angle. The present invention provides a solution to this problem.

The present invention accomplishes this by recessing a short end portion at each longitudinal extremity of at least one shaping rail of the center mold member that supports a flat glass sheet preparatory to bending in a horizontal plane below the general curve of the mold shaping surface. Thus, each longitudinal extremity forms a short, substantially horizontal ledge portion which is recessed below the general curve of the concave shaping surface of the edgewise disposed center mold section rail. The length of the recessed horizontal ledge portion is sufficient to provide a bearing surface for the flat glass of sufficient area to support the bottom surface thereof in flatwise contact.

The present invention will be understood more clearly after the reader has had an opportunity to read a description of a typical illustrative embodiment of the present invention which follows.

In the drawings which form part of the description and wherein like reference numerals refer to like structural elements, FIG. 1 is a fragmentary plan view of a bending mold with the left hand shown in the open position and the right hand shown in the closed position;

FIG. 2 is a longitudinal elevation of the fragments of the mold shown in FIG. 1 depicting the mold supporting the glass sheet in the open and closed mold positions, respectively;

FIG. 3 is a cross-sectional view of a mold rail taken along the lines III—III of FIG. 1;

Figure 4:
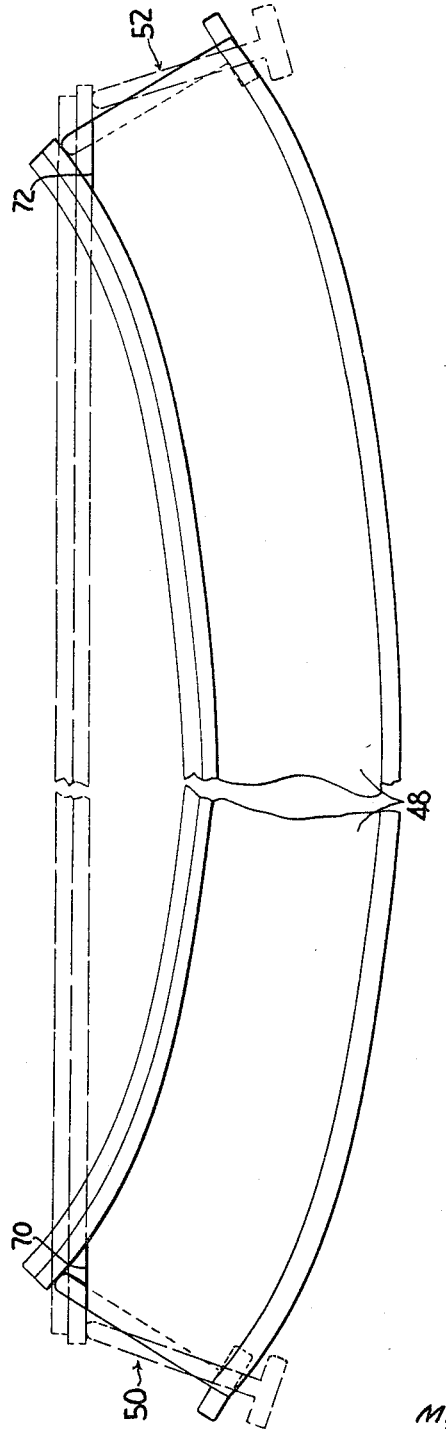
FIG. 4 is an enlarged, fragmentary, diagrammatic showing of the principles by which the present invention operates, illustrating the open position in phantom and the closed position in full lines.
Figure 5:
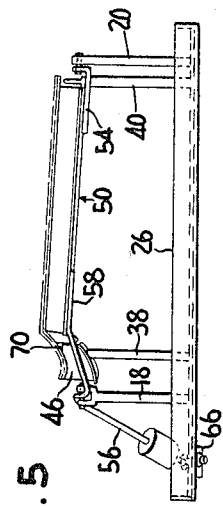
FIG. 5 is an end view partially in perspective of the mold shown in FIGS. 1 and 2.

The mold illustrating the present invention comprises a frame comprising longitudinal angle irons 10 and 12 interconnected at their extremities by transverse angle irons 14 and 16. The latter are mounted to mold supporting carriages (not shown) for displacement through a tunnel-like bending lehr on conventional roll-type conveyors. A typical conveyor of this type is disclosed in U.S. Patent No. 3,068,672 to Lloyd V. Black.

A series of uprights 18, 20, 22, and 24 extend upward from cross members 26 and 28 to provide supports for hinges 30, 32, and 34, 36. Each pair of hinges forms a pivot axis extending transversely of the length of the mold.

The cross members 26 and 28 also support posts 38, 40, 42, and 44.

The latter posts support the longitudinal extremities of a pair of laterally spaced, longitudinally extending center section shaping rails 46 and 48. The upper surfaces of the shaping rails 46 and 48 constitute the center section of a concave, sectionalized, outline shaping surface of the bending mold, since said upper surfaces extend along the longitudinal side edges of said concave shaping surface.

The mold is also provided with end mold sections 50 and 52 disposed beyond the outer extremities of the center section shaping rails 46 and 48. The upper edge surfaces of the end mold sections 50 and 52 form continuations of the shaping surfaces of the shaping rails 46 and 48 in the closed mold position depicted to the right-hand side of FIGS. 1 and 2.

Each of the shaping rails is of inverted "T" cross-section as depicted in FIG. 3. Such construction provides a maximum of structural rigidity for the mold requiring a minimum of additional bracing structure.

End section 50 is pivotally attached with respect to center section shaping rails 46 and 48 about the pivot axis formed by the hinges 30 and 32 by means of an L-shaped member 54 attached to the undersurface of end section 50 at one end and pivotally attached to the hinge 32 at its other end. A lever arm 56 is pivotally attached about hinge 30 and has an extension 58 attached to the undersurface of end section 50. Similarly, an L-shaped member 60, a lever arm 62, and an extension 64 operate in the same manner to pivotally attach end mold section 52 to the hinge axis formed by hinges 34 and 36. Conventional stop members 66 and 68 are provided to limit the downward rotation of lever arms 56 and 62 to insure that the end mold sections 50 and 52 are in the proper position when the mold is closed.

The gist of the present invention resides in the construction of short end portions 70 and 72 of at least one of the center section shaping rails 46 and 48. Each end portion 70 and 72 extends in a horizontal plane recessed below the general curve of the mold shaping surface at the upper edge surface of the center section shaping rail so modified. In this way, each end portion 70 and 72 forms a short, substantially horizontal ledge portion capable of providing flush support for spaced areas adjacent the longitudinal side edge of the supported flat glass sheet intermediate its longitudinal extremities.

The mold sections and hinges are so constructed that when the end sections are pivoted so that their uppermost and outermost upper surface portions occupy the plane occupied by the end portions 70 and 72, the straight line length of the mold in this plane is substantially equal to the curved length of the mold in the closed mold position when the end mold sections form continuations of the center section.

In a typical construction such as the one illustrated, the end portion of each shaping rail was modified to extend in a horizontal plane about ⅛ inch lengthwise along each extreme end of each center section shaping rail. This caused a clearance between the end mold section and the ledge 70 or 72 of about 0.015 inch.

The typical construction illustrates the hinges 30, 32, 34, and 36 forming oblique axes for pivoting the end mold sections relating to the central mold section. Such orientation for the pivot axes permitted the upper surface of the transverse leg of each end mold section 50 and 52 to swing outward into a substantially horizontal position to support the end edges of the flat glass sheet mounted thereon for bending.

In operation, the flat glass was mounted to rest on the ledges 70 and 72 and also on the uppermost portion of the upper edge surfaces of the end mold sections 50 and 52. The glass was transported through a tunnel-like lehr where it was heated to the softening point and the ends were lifted by virtue of the downward movement of the counterweighted lever arms 56 and 62 causing the glass to be lifted with the upward rotation of the end mold sections 50 and 52. Glass produced on such molds was free from kinking and scuff marks and also within the customers' tolerances as to conformity with the desired shape.

The short length at the ends of the center section shaping rails that were recessed below the desired shaping surface did not have any adverse effect upon the curvature of the finished bent glass sheets. This result was surprising in view of the concern of glass technicians working on the project that any deviation of a shaping rail from its proper shaping surface would have an adverse effect upon the shaping of the glass.

While it is understood that the description recites a particular illustrative example, it is understood that the longitudinal extremity of the shaping rail so modified in accordance with the present invention may be recessed by a maximum distance of .020 inch below the general curvature of the shaping surface and may extend in length from about 1/16 inch to about ½ inch, depending upon the severity of the curve imposed on the glass.

The form of the invention shown and described in this disclosure represents an illustrative preferred embodiment thereof. It is understood that various changes may be made without departing from the spirit of the invention as defined in the claimed subject matter which follows:

What is claimed is:

1. In a sectionalized glass sheet bending mold of the concave skeleton type comprising a center molding section including spaced rails having upper shaping surfaces of concave configuration, at least one of said rails having glass supporting end edges disposed in a common plane above the remainder of said rail for supporting a flat glass sheet thereon, and end molding sections having longitudinally outer extremities, said end molding sections being rotatable relative to the center molding section into a spread position wherein a flat sheet of glass may be supported by said longitudinally outer extremities of each of said end molding setcions and each of the end edges of at least one of said spaced rails, said end molding sections being also rotatable into a closed position wherein their longitudinally inner extremities are substantially adjacent to the longitudinal extremities of said spaced rails, the improvement comprising each longitudinal extremity of said shaping rail having its upper edge horizontally disposed to form a pair of horizontal ledge portions below the general curvature of its upper surface in the plane occupied by said outer longitudinal extremities of said end molding sections in said spread position, whereby said horizontal ledge portions make flush contact with the undersurface of a flat glass sheet intermediate its extremities and adjacent its longitudinal side edge when mounted for bending on said mold.

2. The improvement according to claim 1, wherein the horizontal ledge portion at each longitudinal extremity of said shaping rail is spaced from the general curvature of its upper shaping surface by a maximum distance of .020 inch.

3. The improvement according to claim 1, wherein each said horizontal ledge portion has a length of between about $1/16$ inch and about $1/2$ inch.

4. The improvement according to claim 1, wherein the straight line length of the mold in said spread position measured along the plane occupied by said ledge portions is substantially equal to the curved length of the shaping surface in the closed mold position.

5. In a sectionalized mold for bending glass sheets as in claim 1 wherein both said spaced rails of said center molding section have horizontally extending extremity portions in said plane.

6. The improvement according to claim 5, wherein the horizontal ledge portion at each longitudinal extremity of said shaping rail is spaced from the general curvature of its upper shaping surface by a maximum distance of .020 inch.

7. The improvement according to claim 5, wherein each said horizontal ledge portion has a length of between about $1/16$ inch and about $1/2$ inch.

8. The improvement according to claim 5, wherein the straight line length of the mold in said spread position measured along the plane occupied by said ledge portions is substantially equal to the curved length of the shaping surface in the closed mold position.

References Cited by the Examiner

UNITED STATES PATENTS

| | | | |
|---|---|---|---|
| 2,021,180 | 11/1935 | Galey | 65—287 |
| 2,872,756 | 2/1959 | Jendrisak | 65—290 |
| 2,924,045 | 2/1960 | Startzell | 65—288 |

DONALL H. SYLVESTER, *Primary Examiner.*

A. D. KELLOGG, *Assistant Examiner.*